United States Patent
Huang et al.

(10) Patent No.: US 10,187,570 B1
(45) Date of Patent: *Jan. 22, 2019

(54) SURROUND CAMERA TO GENERATE A PARKING VIDEO SIGNAL AND A RECORDER VIDEO SIGNAL FROM A SINGLE SENSOR

(71) Applicant: Ambarella, Inc., Santa Clara, CA (US)

(72) Inventors: Cheng-Yu Huang, Chupei (TW); Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,296

(22) Filed: Nov. 23, 2016

Related U.S. Application Data

(63) Continuation of application No. 13/951,548, filed on Jul. 26, 2013, now Pat. No. 9,538,077.

(51) Int. Cl.
| | |
|---|---|
| *H04N 5/00* | (2011.01) |
| *H04N 5/232* | (2006.01) |
| *B60R 1/00* | (2006.01) |
| *G02B 13/06* | (2006.01) |
| *B60R 11/04* | (2006.01) |
| *G06T 3/00* | (2006.01) |
| *G06T 7/00* | (2017.01) |
| *H04N 7/18* | (2006.01) |
| *G06T 5/00* | (2006.01) |

(Continued)

(52) U.S. Cl.
CPC ....... *H04N 5/23238* (2013.01); *G06T 3/0093* (2013.01); *G06T 5/006* (2013.01); *G06T 5/20* (2013.01); *G06T 7/0018* (2013.01); *H04N 5/23293* (2013.01); *H04N 7/183* (2013.01); *G06T 2207/10016* (2013.01); *G06T 2207/30264* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 9,126,525 B2 * | 9/2015 | Lynam | B60Q 9/005 |
| 2004/0220705 A1 | 11/2004 | Basir et al. | 701/1 |
| 2005/0050344 A1 | 3/2005 | Hull | 713/193 |

(Continued)

OTHER PUBLICATIONS

"Xylon Test Vehicle Surround View Parking Assistance DA", https://www.youtube.com/watch?v=6fZ0jwTUNuI, Apr. 13, 2011, 9 pages.

*Primary Examiner* — Edemio Navas, Jr.
(74) *Attorney, Agent, or Firm* — Christopher P. Maiorana, PC

(57) ABSTRACT

An apparatus comprising a sensor and a processor. The sensor may be configured to capture a first video signal having a first field of view. The processor may be configured to generate a second video signal having a second field of view and a third video signal having a third field of view. The second video signal may generate the second field of view to include a first portion of the first video signal. The third video signal may generate the third field of view to include a second portion of the first video signal. The second portion may be processed to remove possible warping present on a bottom portion of the first video signal. The first and second portions may comprise an area less than the first field of view.

17 Claims, 3 Drawing Sheets

(51) Int. Cl.
  *G06T 5/20*  (2006.01)
  *H04N 5/247*  (2006.01)

(56) References Cited

U.S. PATENT DOCUMENTS

| | | | |
|---|---|---|---|
| 2005/0062869 A1* | 3/2005 | Zimmermann | G02B 13/06 348/335 |
| 2007/0240060 A1 | 10/2007 | Berenbach | 715/723 |
| 2008/0150854 A1* | 6/2008 | Bryant | B60Q 1/503 345/87 |
| 2009/0125234 A1* | 5/2009 | Geelen | G01C 21/3647 701/533 |
| 2009/0174773 A1 | 7/2009 | Gowdy et al. | 348/148 |
| 2010/0166068 A1* | 7/2010 | Perlman | H04N 21/231 375/240.12 |
| 2010/0238289 A1* | 9/2010 | Wu | B60R 1/12 348/148 |
| 2011/0075889 A1 | 3/2011 | Huang | 382/107 |
| 2013/0162625 A1* | 6/2013 | Schmit | G06T 3/40 345/419 |

\* cited by examiner

SURROUND CAMERA TO GENERATE A PARKING VIDEO SIGNAL AND A RECORDER VIDEO SIGNAL FROM A SINGLE SENSOR

This application relates to U.S. Ser. No. 13/951,548, filed Jul. 26, 2013, which is incorporated by reference in its entirety.

This application relates to co-pending U.S. application Ser. No. 13/949,624, filed Jul. 24, 2013, which is incorporated by reference in its entirety.

FIELD OF THE INVENTION

The present invention relates to cameras used in automobiles generally and, more particularly, to a surround camera to generate a parking signal and a recording signal from a single sensor.

BACKGROUND OF THE INVENTION

Conventional automobiles using surround cameras are becoming increasingly popular. Such cameras are typically used to facilitate parking by a driver. Some surround cameras are even used for automatic parking by the vehicle. In such systems, the driver is presented with a "bird's eye" view of the vehicle. These cameras typically do not support recording. At the same time, dash cameras that continuously record video in case an accident happens are growing in popularity. Such cameras use a single camera that is mounted on a windshield.

The view that a surround camera presents to a driver for parking assistance and the view that is presented for surround recording are different views. A parking camera needs to point relatively downward. A recording camera needs to point relatively straight. With conventional approaches, customers will need to install two separate sets of cameras, which means higher cost and installation complexity.

It would be desirable to implement a single surround camera that may be used to supply views for both parking and recording.

SUMMARY OF THE INVENTION

The present invention concerns an apparatus comprising a sensor and a processor. The sensor may be configured to capture a first video signal having a first field of view. The processor may be configured to generate a second video signal having a second field of view and a third video signal having a third field of view. The second video signal may generate the second field of view to include a first portion of the first video signal. The third video signal may generate the third field of view to include a second portion of the first video signal. The second portion may be processed to remove possible warping present on a bottom portion of the first video signal. The first and second portions may comprise an area less than the first field of view.

The objects, features and advantages of the present invention include providing a camera that may (i) use a single sensor to generate multiple views, (ii) process a signal received by the sensor and/or (iii) be implemented in a surround camera environment.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
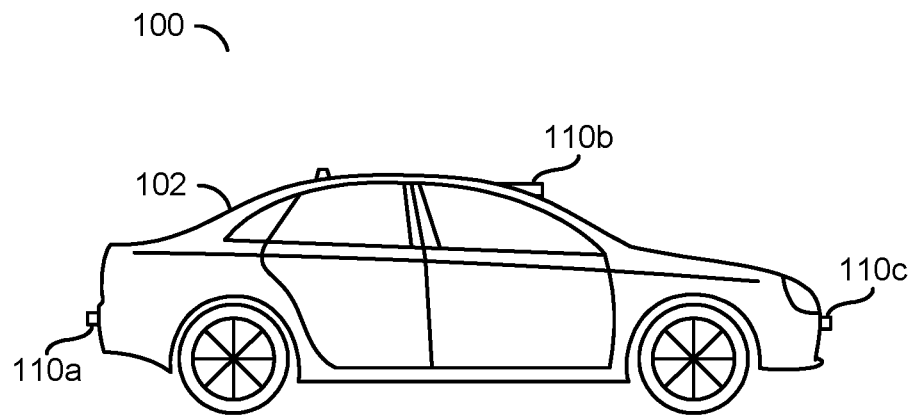
FIG. 1 is a diagram illustrating a context of the invention.

Referring to FIG. 1, a block diagram of a system 100 is shown in accordance with a preferred embodiment of the present invention. The system 100 generally comprises a vehicle 102, and a number of cameras 110a, 110b and 110c. The cameras 110a-110c may be connected within the vehicle 102 through one or more busses. The busses may be implemented as CAT5, CAT6, Universal Serial Bus (USB) or other types of cables and/or connectors. The particular type of cabling used may be varied to meet the design criteria of a particular implementation.

Figure 2:
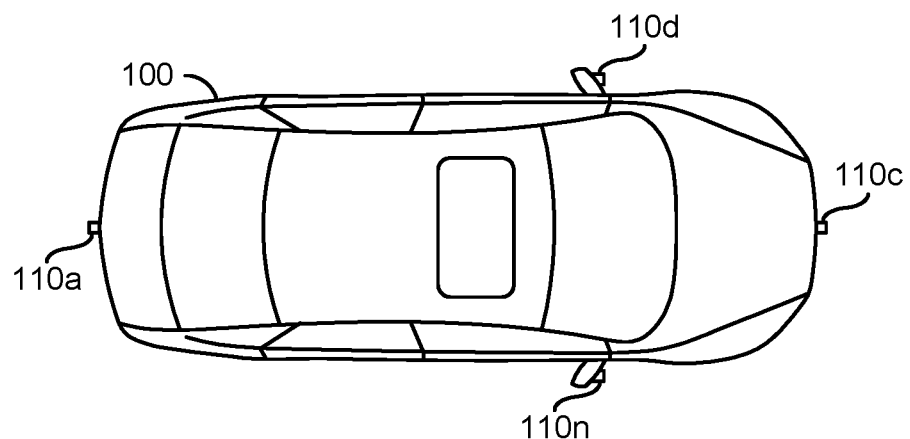
FIG. 2 is a top view of a vehicle implementing an embodiment of the invention.

Referring to FIG. 2, a top view of the system 100 is shown. The vehicle 102 is shown with a number of cameras 110a, 110c, 110d and 110n. The particular number of cameras 110a-110n implemented may be varied to meet the design criteria of a particular implementation. The vehicle 102 may be described as an automobile. However, the particular type of vehicle may be varied to meet the design criteria of a particular implementation. For example, the vehicle 102 may be a truck, or other type of vehicle operated by a driver.

Figure 3:
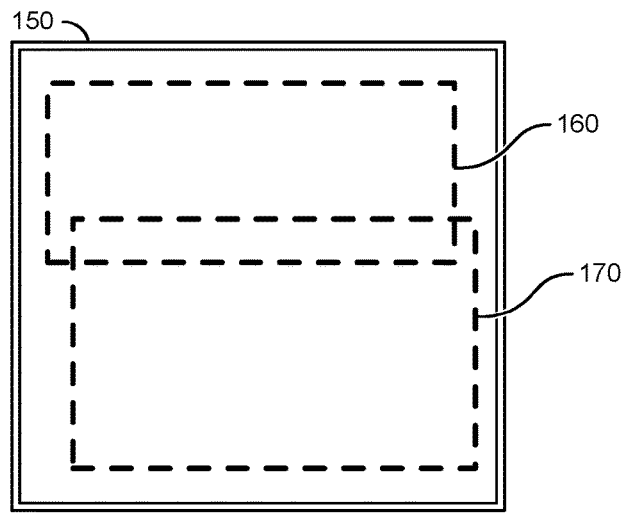
FIG. 3 is a diagram illustrating various fields of view from a sensor.

Referring to FIG. 3, a diagram illustrating a video feed 150 from one of the cameras 110a-110n is shown. The video feed 150 generally comprises a portion 160 and a portion 170. The portion 160 may be used for a first view. The portion 170 may be used for a second view. The portion 160 may include a field of view (e.g., a horizontal view) that may be usable for a dash mounted recorder. The view 170 includes a field of view (e.g., a surround view) that may be usable for a surround-type parking implementation. The view 160 and the view 170 may record actions (e.g., other vehicles, people, etc.) around the vehicle 102. In some embodiments, the view 160 and the view 170 may overlap. In other embodiments, the view 160 and the view 170 may be disjoint.

Figure 4:
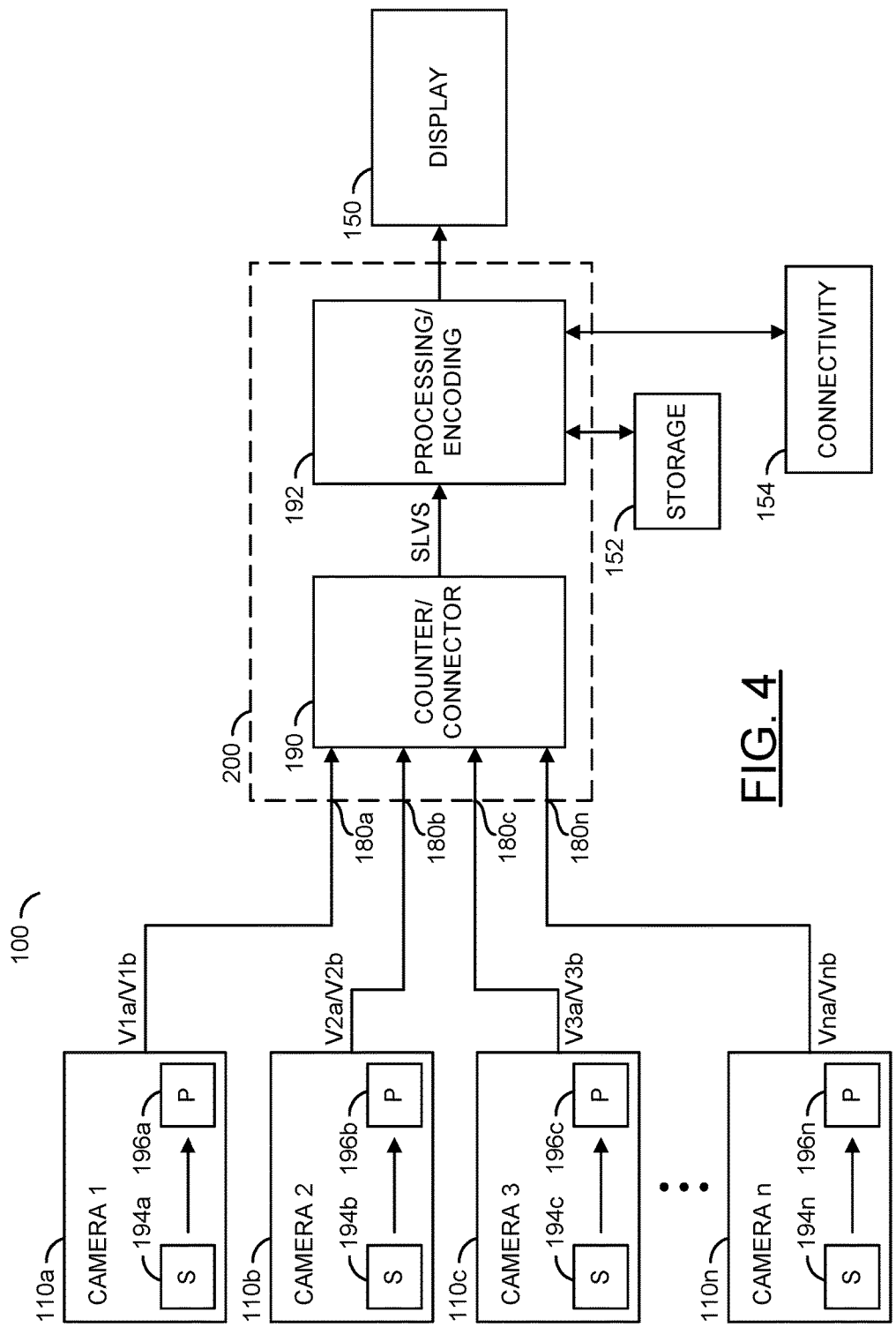
FIG. 4 is a diagram illustrating various connections.

Referring to FIG. 4, a diagram of the various connections to the cameras 110a-110n are shown. A circuit 200 may have a number of inputs 180a-180n. The circuit 200 generally comprises a circuit 190 and a circuit 192. The circuit 190 may be implemented as a counter/connector circuit. The circuit 192 may be implemented as a processing and/or encoding circuit. In one example, the circuit 190 may be implemented on the same integrated circuit as the circuit 192. In another example, the circuit 190 may be implemented as a separate integrated circuit from the circuit 192. In another example, the circuit 190 may be hardware and/or firmware implemented as a subset of the circuit 192. The circuit 190 may present a signal (e.g., SLVS) to the circuit 192. The signal SLVS may be a video signal. In one example, the signal SLVS may be a selected one of the signals V1a/V1b-VNa/VNb.

The circuit 200 may be connected to a block (or circuit) 152 and/or a block (or circuit) 154. The circuit 152 may be implemented as a storage device. For example, the circuit 152 may be implemented as be a SD card, a built-in drive, or other storage medium. The circuit 154 may be a connectivity device, such as a Wi-Fi device, a 3G/4G device, or other device that may be used to transmit the video signal SLVS to/from the processing and/or encoding circuit 192. The processing and/or encoding circuit 192 may present a signal to the display 150 (for viewing), a signal to the storage device 152 (for storage), or a signal to the connectivity circuit 154 (for connection to external devices, such as the Internet).

The circuits 110a-110n may be implemented as camera modules. The circuit 110a may be implemented having a sensor 194a and a processing chip 196a. The sensor 194a may include a lens. The cameras 110b-110n may have similar implementations. The circuits 196a-196n may be implemented as serial/deserial (SERDES) circuits. The circuits 196a-196n may be used to transmit the video signals V1a/V1b-VNa/VNb to the circuit 200.

The system 100 may provide a design to generate a number of surround camera views as well as a number of horizontal views for recording. Each of the cameras 110a-110n may present a first view (e.g., V1a-VNa) for recording, and a second view (e.g., V1b-VNb) for viewing. The circuit 192 may be used to process one or more of video signals V1a-VNb. The processing may provide de-warping and/or other processing to remove potential distortions found in a wide angle lens-type sensor. The de-warping may be implemented on one of the views (e.g., 170) without interrupting the generation of another of the views (e.g., 160).

Figure 5:
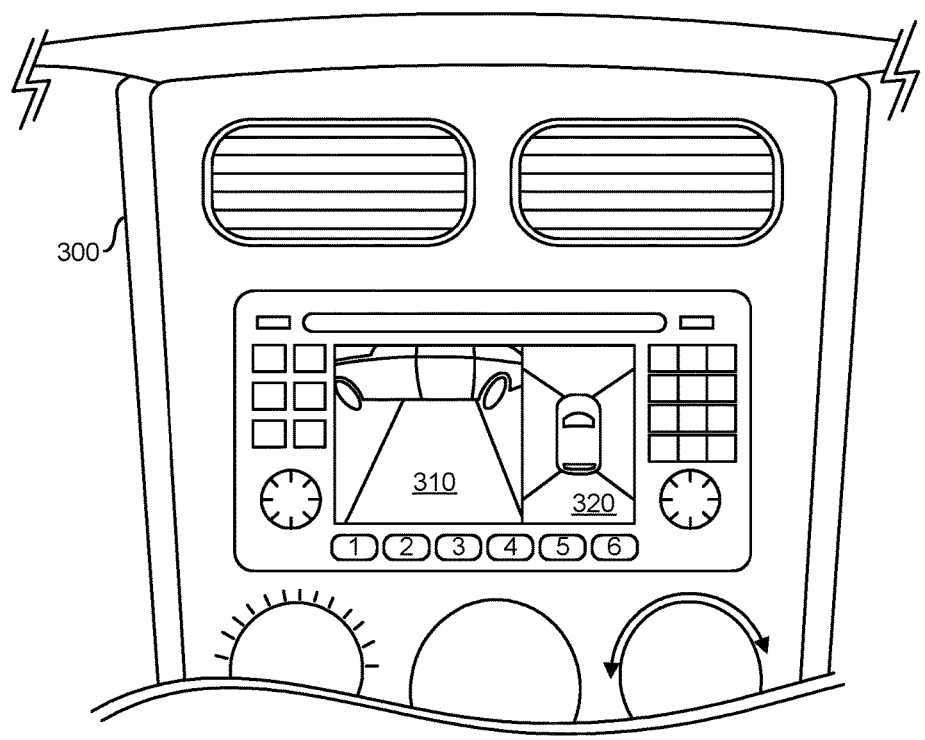
FIG. 5 is a diagram illustrating a two field of view dashboard display.

Referring to FIG. 5, the diagram of a dashboard 300 is shown. The dashboard 300 includes a screen (or display) 310 and a screen (or display) 320. In one example, the screen 310 and the screen 320 may be implemented as separate views on a single screen. In another example, the screen 310 and the screen 320 may be separate screens.

Each of the cameras 110a-110n may include a wide angle (e.g., 180 degree field of view or more) lens that may include full high definition (HD) (or higher) resolution sensors, pointed slightly downward. For example, a fish eye lens-type sensor may be implemented. The bottom portion of the video feed may be cropped and corrected for geometric distortion in the circuit 192 to generate the view 170 showing the ground near the vehicle 102. In some embodiments, a central portion of the video feed may be cropped to generate the view 160. The resolution of each of the views 160 and/or 170 may be increased or decreased, but may be sufficient for presenting a "bird's eye" display. For example, the feeds V1a/V1b-VNa-VNb may be 1920×600 lines of resolution. The SoC circuit 190 may combine a number of such feeds (e.g., 2, 4, 8, etc.) into a single bird's eye view. Standard resolutions used for recording (e.g., the view 160) may include 1920×1080, 1280×720, 640×480, 720×576, 720×480, etc. However, the particular resolution implemented may be varied to meet the design criteria of a particular implementation. For the parking view (e.g., the view 170), resolutions such as 640×480 or 800×600 or 1280×720 may be used. The parking view may be based on either the rear camera view, or by stitching together two or more smaller views in the circuit 190 from the various cameras 110a-110n. Each parking view may be relatively small, such as 640×200 or 480×200.

The circuit 200 may generate a full view by processing with a "dewarp" engine. A recorded frame may also be implemented for the various feeds. The recording signals V1a-VNa do not normally need to be interrupted for displaying the parking mode signals V1b-Vnb. One or more of the recording signals V1a-VNa may be used to provide driver assist analytics. For example, a lane departure warning may be implemented.

The circuit 200 may implement a calibration process. For example, the cameras 110a-110n may slightly move during the life of the vehicle 102. The processor 190 may compensate for such movement. The particular type of compensation implemented may be varied to meet the design criteria of a particular implementation.

While the invention has been particularly shown and described with reference to the preferred embodiments thereof, it will be understood by those skilled in the art that various changes in form and details may be made without departing from the scope of the invention.

The invention claimed is:

1. An apparatus comprising:
an interface configured to receive a video signal having a first field of view; and
a circuit, connected to the interface, configured to (a) generate a second field of view and a third field of view both from said video signal received from said interface and (b) encode said second field of view, wherein (i) said second field of view is (A) encoded for storage and (B) not presented to a display for viewing, (ii) said third field of view is (A) presented to said display for viewing and (B) not encoded, (iii) said second field of view and said third field of view each comprise an area less than said first field of view and (iv) said second field of view and said third field of view are both generated from a portion of said video signal captured by a camera sensor of a single camera.

2. The apparatus according to claim 1, wherein said second field of view and said third field of view are generated without installing a first camera to generate said second field of view and a second camera to generate said third field of view.

3. The apparatus according to claim 1, wherein said second field of view and said third field of view are generated from said single camera in a camera system comprising a plurality of cameras.

4. The apparatus according to claim 1, wherein said video signal is (i) cropped to generate said second field of view usable as a dash mounted recorder to record actions around a vehicle and (ii) cropped and corrected to generate said third field of view showing a surround view on a dash mounted display.

5. The apparatus according to claim 1, wherein said single camera is part of a camera system comprising a plurality of sensors configured to capture a surround view of a vehicle to display in one of a plurality of portions of a dash mounted display.

6. The apparatus according to claim 1, wherein said circuit is configured to crop and correct said video signal for geometric distortion to generate said third field of view.

7. The apparatus according to claim 1, wherein said circuit is configured to de-warp said video signal to generate said second field of view without interruption of the generation of said third field of view by said circuit.

8. The apparatus according to claim 1, wherein said second field of view is encoded to have a higher resolution than said third field of view presented to said display.

9. The apparatus according to claim 1, wherein said circuit is further configured to implement a calibration process to compensate for a movement of said single camera.

10. The apparatus according to claim 1, wherein said storage comprises at least one of a SD card and a built-in storage drive.

11. The apparatus according to claim 1, wherein said circuit comprises a dewarp engine.

12. The apparatus according to claim 1, wherein said circuit is further configured to implement driver assist analytics based on said video signal.

13. The apparatus according to claim 1, wherein said single camera comprises a wide angle lens.

14. The apparatus according to claim 1, wherein said single camera comprises a fish eye lens configured to capture said first field of view of at least one of (i) 180 degrees and (ii) greater than 180 degrees.

15. The apparatus according to claim 1, wherein said single camera comprises a fish eye lens configured to capture said first field of view less than 180 degrees.

16. An apparatus comprising:
a sensor configured to generate a video signal having a first field of view; and
a processor configured to (a) generate a second field of view and a third field of view both from said video signal generated by said sensor and (b) encode said second field of view, wherein (i) said second field of view is (A) encoded for storage and (B) not presented to a display for viewing, (ii) said third field of view is (A) presented to said display for viewing and (B) not encoded, (iii) said second and third fields of view each comprise an area less than said first field of view and (iv) said second field of view and said third field of view are both generated from a portion of said video signal captured by a single sensor of a camera system.

17. An apparatus comprising:
an interface configured to receive a first video signal having a first field of view from a sensor; and
a circuit, connected to the interface, configured to (a) generate a second video signal having a second field of view and a third video signal having a third field of view both from said first video signal generated by said sensor and (b) encode said second video signal, wherein (i) said second video signal is (A) encoded for recording to a storage device and (B) not presented to a display for viewing, (ii) said third video signal is (A) presented to said display for viewing and (B) not encoded, (iii) at least one of said second video signal and said third video signal is processed to remove possible warping present on a bottom portion of said first video signal, (iv) said second and third fields of view each comprise an area less than said first field of view and (v) said second field of view and said third field of view are both generated from a single sensor of a camera without installing separate sets of sensors.

* * * * *